United States Patent
Anderson

(10) Patent No.: US 11,734,377 B2
(45) Date of Patent: *Aug. 22, 2023

(54) UNIVERSAL VISITOR IDENTIFICATION SYSTEM

(71) Applicant: TEALIUM INC., San Diego, CA (US)

(72) Inventor: Michael Anderson, Carlsbad, CA (US)

(73) Assignee: TEALIUM INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/827,318

(22) Filed: May 27, 2022

(65) Prior Publication Data
US 2022/0405332 A1    Dec. 22, 2022

Related U.S. Application Data

(60) Continuation of application No. 17/091,447, filed on Nov. 6, 2020, now Pat. No. 11,347,824, which is a
(Continued)

(51) Int. Cl.
*H04L 29/08* (2006.01)
*G06F 16/957* (2019.01)
(Continued)

(52) U.S. Cl.
CPC ............ *G06F 16/957* (2019.01); *H04L 67/02* (2013.01); *H04L 67/306* (2013.01); *H04L 67/53* (2022.05); *H04L 69/329* (2013.01); *H04L 67/535* (2022.05)

(58) Field of Classification Search
CPC ....... G06F 16/957; H04L 67/53; H04L 67/02; H04L 67/306
(Continued)

(56) References Cited

U.S. PATENT DOCUMENTS

| 6,067,565 A | 5/2000 | Horvitz |
| 6,553,393 B1 | 4/2003 | Eilbott |

(Continued)

FOREIGN PATENT DOCUMENTS

| CN | 102693501 A | 9/2012 |
| WO | WO 2009/009109 | 1/2009 |

(Continued)

OTHER PUBLICATIONS

Access your campaign report in Google Analytics, http://help.campaignmonitor.com/topic.aspx?t=112, retrieved on Feb. 10, 2014, in 5 pages.
(Continued)

*Primary Examiner* — Adnan M Mirza
(74) *Attorney, Agent, or Firm* — Knobbe, Martens, Olson & Bear LLP

(57) ABSTRACT

A tag management system can include features to assist in developing a cross-vendor profile for individual visitors to content pages of a content site. The visitors to the content site can obtain universal identifiers usable by the content site to identify the visitors. The universal identifiers can be included in the content pages by the visitor end user systems so that browser tags that may not have native access to the universal identifier can access the universal identifiers. The universal identifiers may then be provided to tag vendor systems with associated visitor data, thereby enabling the tag vendor systems to provide processed or raw data that can be compared by individual universal identifiers. Using this processed data, the content site can prepare the cross-vendor profile of individual visitors and realize insights that may be unavailable using conventional systems and methods.

20 Claims, 8 Drawing Sheets

Related U.S. Application Data continuation of application No. 16/403,272, filed on May 3, 2019, now Pat. No. 10,831,852, which is a continuation of application No. 15/622,468, filed on Jun. 14, 2017, now Pat. No. 10,282,383, which is a continuation of application No. 14/629,989, filed on Feb. 24, 2015, now Pat. No. 9,690,868, which is a division of application No. 14/532,771, filed on Nov. 4, 2014, now Pat. No. 8,990,298.

(60) Provisional application No. 61/900,274, filed on Nov. 5, 2013.

(51) Int. Cl.
  *H04L 67/306* (2022.01)
  *H04L 67/02* (2022.01)
  *H04L 69/329* (2022.01)
  *H04L 67/53* (2022.01)
  *H04L 67/50* (2022.01)

(58) Field of Classification Search
  USPC .......................................................... 707/756
  See application file for complete search history.

(56) References Cited

U.S. PATENT DOCUMENTS

| | | |
|---|---|---|
| 6,553,461 B1 | 4/2003 | Gupta |
| 6,836,799 B1 | 12/2004 | Philyaw et al. |
| 7,117,429 B2 | 10/2006 | Vedullapalli |
| 7,669,183 B2 | 2/2010 | Bowman |
| 7,685,168 B2 | 3/2010 | Koinuma et al. |
| 7,685,200 B2 | 3/2010 | Gunawardena et al. |
| 7,805,670 B2 | 9/2010 | Lipton et al. |
| 7,823,059 B2 | 10/2010 | Hodgkinson |
| 7,890,461 B2 | 2/2011 | Oeda et al. |
| 7,908,336 B2 | 3/2011 | Carlson et al. |
| 7,992,135 B1 | 8/2011 | Wong et al. |
| 8,010,890 B2 | 8/2011 | Gumz et al. |
| 8,019,777 B2 | 9/2011 | Hauser |
| 8,131,861 B2 | 3/2012 | Butler et al. |
| 8,185,610 B2 | 5/2012 | Goff |
| 8,316,188 B2 | 11/2012 | Kadambi et al. |
| 8,375,319 B2 | 2/2013 | Decker et al. |
| 8,407,321 B2 | 3/2013 | Mickens et al. |
| 8,413,046 B1 | 4/2013 | Mocanu |
| 8,429,243 B1 | 4/2013 | Wang et al. |
| 8,539,345 B2 | 9/2013 | Appleyard et al. |
| 8,560,610 B2 | 10/2013 | Lunt et al. |
| 8,566,696 B1 | 10/2013 | Hamon |
| 8,682,964 B1 | 3/2014 | Brundage |
| 8,744,988 B1 | 6/2014 | Hamon |
| 8,805,946 B1 | 8/2014 | Glommen et al. |
| 8,843,827 B2 | 9/2014 | Koo et al. |
| 8,904,278 B1 | 12/2014 | Anderson et al. |
| 8,990,298 B1 | 3/2015 | Anderson |
| 9,021,352 B2 | 4/2015 | Goel |
| 9,081,789 B2 | 7/2015 | Anderson |
| 9,116,608 B2 | 8/2015 | Koo et al. |
| 9,165,308 B2 | 10/2015 | Cook |
| 9,288,256 B2 | 3/2016 | Goodwin |
| 9,313,287 B2 | 4/2016 | Glommen |
| 9,357,023 B2 | 5/2016 | Glommen |
| 9,412,115 B2 | 8/2016 | Seolas |
| 9,479,609 B2 | 10/2016 | Anderson |
| 9,503,499 B1 | 11/2016 | Donaldson |
| 9,537,964 B2 | 1/2017 | Glommen et al. |
| 9,690,868 B2 | 6/2017 | Anderson |
| 9,769,252 B2 | 9/2017 | Glommen |
| 10,356,191 B2 | 7/2019 | Glommen |
| 2001/0042171 A1 | 11/2001 | Vermeulen |
| 2002/0078147 A1 | 6/2002 | Bouthors et al. |
| 2002/0083167 A1 | 6/2002 | Costigan et al. |
| 2003/0001888 A1 | 1/2003 | Power |
| 2003/0184452 A1 | 10/2003 | Goodgoll |
| 2004/0003130 A1 | 1/2004 | Becker |
| 2004/0054784 A1 | 3/2004 | Busch et al. |
| 2004/0083259 A1 | 4/2004 | Tenembaum |
| 2004/0123044 A1 | 6/2004 | Franaszek |
| 2004/0243939 A1* | 12/2004 | Perepa ................. H04L 69/329 707/E17.121 |
| 2005/0125289 A1 | 6/2005 | Beyda et al. |
| 2005/0125290 A1 | 6/2005 | Beyda et al. |
| 2005/0138143 A1 | 6/2005 | Thompson |
| 2005/0154781 A1 | 7/2005 | Carlson et al. |
| 2005/0165643 A1 | 7/2005 | Wilson et al. |
| 2006/0031778 A1 | 2/2006 | Goodwin et al. |
| 2006/0195779 A1 | 8/2006 | McElroy |
| 2006/0218223 A1 | 9/2006 | Uchida |
| 2006/0271669 A1 | 11/2006 | Bouguenon et al. |
| 2006/0277198 A1 | 12/2006 | Error |
| 2007/0250618 A1 | 10/2007 | Hammond |
| 2008/0046562 A1 | 2/2008 | Butler |
| 2008/0077561 A1 | 3/2008 | Yomtobian |
| 2008/0228578 A1* | 9/2008 | Mashinsky ............. H04L 67/02 709/224 |
| 2008/0244051 A1 | 10/2008 | Morris |
| 2009/0006945 A1 | 1/2009 | Gumz et al. |
| 2009/0228774 A1 | 9/2009 | Matheny |
| 2009/0248494 A1 | 10/2009 | Hueter et al. |
| 2009/0293001 A1 | 11/2009 | Lu et al. |
| 2010/0066688 A1 | 3/2010 | Jeon |
| 2010/0179967 A1 | 7/2010 | Zhang et al. |
| 2010/0228850 A1 | 9/2010 | Fomitchev |
| 2010/0251128 A1 | 9/2010 | Cordasco |
| 2010/0281008 A1 | 11/2010 | Braunwarth |
| 2010/0281178 A1 | 11/2010 | Sullivan |
| 2010/0318976 A1 | 12/2010 | Everly et al. |
| 2011/0015981 A1 | 1/2011 | Subramanian |
| 2011/0055314 A1 | 3/2011 | Rosenstein et al. |
| 2011/0055710 A1 | 3/2011 | Kirkby et al. |
| 2011/0082858 A1 | 4/2011 | Yu et al. |
| 2011/0093461 A1 | 4/2011 | Mui et al. |
| 2011/0119374 A1 | 5/2011 | Ruhl et al. |
| 2011/0153422 A1 | 6/2011 | Cousins |
| 2011/0153796 A1 | 6/2011 | Branson |
| 2011/0167391 A1 | 7/2011 | Momeyer et al. |
| 2011/0185016 A1 | 7/2011 | Kandasamy et al. |
| 2011/0219115 A1 | 9/2011 | Capel et al. |
| 2011/0246879 A1 | 10/2011 | White et al. |
| 2011/0282739 A1 | 11/2011 | Mashinsky et al. |
| 2011/0296322 A1 | 12/2011 | Dhanjal et al. |
| 2011/0302306 A1 | 12/2011 | Hanson et al. |
| 2011/0314092 A1 | 12/2011 | Lunt et al. |
| 2012/0005257 A1 | 1/2012 | Narayanan et al. |
| 2012/0016836 A1 | 1/2012 | Fender et al. |
| 2012/0054596 A1 | 3/2012 | Kroger et al. |
| 2012/0066289 A1 | 3/2012 | Bland |
| 2012/0096013 A1 | 4/2012 | Ciancutti |
| 2012/0124131 A1 | 5/2012 | Muret et al. |
| 2012/0154292 A1 | 6/2012 | Zhao et al. |
| 2012/0169624 A1 | 7/2012 | Garn et al. |
| 2012/0221411 A1 | 8/2012 | Graham, Jr. |
| 2013/0055104 A1 | 2/2013 | Everingham |
| 2013/0073401 A1 | 3/2013 | Cook |
| 2013/0086484 A1 | 4/2013 | Antin et al. |
| 2013/0091025 A1 | 4/2013 | Farahat et al. |
| 2013/0110818 A1* | 5/2013 | O'Brien-Strain ... G06F 16/9577 707/758 |
| 2013/0124332 A1 | 5/2013 | Doughty et al. |
| 2013/0191208 A1 | 7/2013 | Chourey et al. |
| 2013/0254897 A1 | 9/2013 | Reedy |
| 2013/0282898 A1 | 10/2013 | Kalus et al. |
| 2013/0290480 A1 | 10/2013 | Manion et al. |
| 2013/0332604 A1 | 12/2013 | Seth et al. |
| 2014/0013203 A1 | 1/2014 | Rogoveanu |
| 2014/0081981 A1 | 3/2014 | Morris |
| 2014/0089330 A1 | 3/2014 | Cui |
| 2014/0215050 A1 | 7/2014 | Lu |
| 2014/0304389 A1 | 10/2014 | Reavis |
| 2014/0379840 A1 | 12/2014 | Dao et al. |
| 2015/0066587 A1 | 3/2015 | Glommen et al. |
| 2015/0120858 A1 | 4/2015 | Anderson |

(56) References Cited

U.S. PATENT DOCUMENTS

| | | | |
|---|---|---|---|
| 2015/0127720 A1 | 5/2015 | Glommen et al. | |
| 2015/0169784 A1 | 6/2015 | Anderson | |
| 2015/0200994 A1 | 7/2015 | Jain et al. | |
| 2015/0212992 A1 | 7/2015 | Anderson | |
| 2016/0004673 A1 | 1/2016 | Cook | |
| 2016/0026720 A1 | 1/2016 | Lehrer et al. | |
| 2016/0044128 A1 | 2/2016 | Anderson | |
| 2016/0072905 A1 | 3/2016 | Glommen | |
| 2016/0087932 A1* | 3/2016 | Hergenhan | H04L 67/02 709/218 |
| 2016/0381122 A1 | 12/2016 | Glommen | |
| 2017/0041426 A1 | 2/2017 | Anderson | |
| 2017/0208146 A1 | 7/2017 | Glommen et al. | |
| 2018/0032628 A1 | 2/2018 | Anderson | |
| 2020/0106844 A1 | 4/2020 | Glommen | |

FOREIGN PATENT DOCUMENTS

| | | |
|---|---|---|
| WO | WO 2011/128924 | 10/2011 |
| WO | WO 2013/003302 | 1/2013 |

OTHER PUBLICATIONS

Adobe Analytics/Tag management, http://www.adobe.com/in/solutions/digital-analytics/tag-management.html, retrieved on Feb. 10, 2014, in 1 page.
Behnam, Ali, "Taking Your Test Platform to the Next Level", http://teallum.com/blog/digital-marketing/taking-your-test-platform-to-the-next-level/, retrieved Jan. 12, 2014, in 10 pages.
"Boosting Marketing Agility with Enterprise Tag & Data Management", Ensighten, dated Jun. 2013, in 14 pages.
eVisit Analyst 8 Features, http://www.evisitanalyst.com/eva8, retrieved on Feb. 10, 2014, in 6 pages.
Handwrite on mobile, Google, https://support.google.com/websearch/answer/26849515?p=sbw_tips&hl=en&rd=2, retrieved Jan. 12, 2014, in 3 pages.
Improving Testing & Optimization Through Tag Management—Key Factors to Consider When Choosing the Right Tag Management Solution, Tealium, dated Sep. 2013, in 12 pages.
Padolsey, James, "Avoiding DOM Flickering", published: Jul. 23, 2009, pp. 1-6, http://james.padolsey.com/javascript/avoiding-dom-flickering/.
"Site Tagging Best Practices Version 1.0 Draft Public Comment", iab (Interactive Advertising Bureau), dated Nov. 29, 2012, in 18 pages.
"TagMan and Digital Fulcrum Join Forces to Optimize Performance of Legacy 3rd Party Tags", http://www.tagman.com/tagman-and-digital-fulcrum-join-forces-to-optimize-performance-of-leqacy-3rd-party-tags/, New York, NY, dated Feb. 9, 2012, in 3 pages.
Website: 'TheScarms', "ASP.net V2.0 Client-Side JavaScript Callbacks (AJAX)", published: Jul. 18, 2007, pp. 1-4, https://web.archive.org/web/20070718054551/http://www.thescarms.com/dotnet/ajax.aspx.
West, "Tag management Systems: How do I choose?" Demystified, Jul. 29, 2013, in 5 pages.
International Search Report and Written Opinion issued in International Application No. PCT/US2014/012217 dated May 21, 2014, in 11 pages.
"Preload CSS/JavaScript without execution," http://www.phpied.com/preload-cssjavascript-without-execution, Apr. 21, 2010, in 14 pages.
"What are the ways to load JavaScript or CSS without executing them?" http://stackoverflow.com/questions/8843132/what-are-the-ways-to-load-javascript-or-css-without-executing-them, Jan. 12, 2012, in 4 pages.
"Separating JavaScript Download and Execution," http://www.nczonline.net/blog/2011/02/14/separating-javascript-download-and-execution, Feb. 14, 2014, in 7 pages.
International Search Report and Written Opinion issued in International Application No. PCT/US2014/052774 dated Dec. 29, 2014, in 23 pages.
International Search Report and Written Opinion issued in International Application No. PCT/US2014/052766 dated Dec. 8, 2014, in 11 pages.
International Search Report and Written Opinion issued in International Application No. PCT/US2014/063927 dated Jan. 29, 2015, in 11 pages.
MSDN, "Event Handling in HTML Elements Sample", Dec. 18, 2010, pp. 1-5.
David Flanagan, "JavaScript: The Definitive Guide", 2002, p. 185.
"Does the <script> tag position in HTML affects performance of the webpage?", Published: Apr. 24, 2013, pp. 1-7.
"Features—Segment, Features to Explore," screenshot of website retrieved from <http://www.segment.com/tour/features> on Nov. 4, 2015, 4 pages.
Floodlight Tag Format—DFA Partner Help, https://support.google.com/dfa/partner/answer/154049, accessed on Apr. 13, 2016, in 5 pages.
Google, Google Tag Manager: iOS v3—Getting Started, https://developers.google.com/tagmanager/ios/v3/, retrieved on Sep. 8, 2017, from the Sep. 15, 2014 wayback machine capture (https://web.archive.org/web/20140915200723/https://developers.google.com/tag-manager/ios/v3/) (13 pages).
"Segment—We make customer data simple," screenshot of website retrieved from <http://www.segment.com/home> on Nov. 4, 2015, 4 pages.
"Integrations for every team," screenshot of website retrieved from <http://www.segment.com/home> on Nov. 4, 2015, 1 page.

* cited by examiner

Select ID Group: [Group 123 ▼] — 710

| Universal ID | Vendor 1 Metric | Vendor 2 Metric | Vendor 3 Metric |
|---|---|---|---|
| 100,000 | Feedback-sensitive | Sporting Equipment | High Value |
| 100,001 | Time-sensitive | Electronics | Low Value |
| 100,002 | Feedback-sensitive | Home and Garden | Medium Value |
| 100,003 | Price-sensitive | Electronics | High Value |
| 100,004 | Price-sensitive | Beauty and Health | Medium Value |
| 100,005 | Feedback-sensitive | Movies and Music | Low Value |
| 100,006 | Price-sensitive | Electronics | Low Value |
| 100,007 | Price-sensitive | Home and Garden | High Value |
| 100,008 | Time-sensitive | Beauty and Health | Medium Value |

Select Attribute: [Advertising Characteristics ▼] — 720

UNIVERSAL VISITOR IDENTIFICATION SYSTEM

RELATED APPLICATIONS

This application is a continuation of U.S. patent application Ser. No. 17/091,447, filed Nov. 6, 2020, entitled "UNIVERSAL VISITOR IDENTIFICATION SYSTEM," which is a continuation of U.S. patent application Ser. No. 16/403,272, filed May 3, 2019, entitled "UNIVERSAL VISITOR IDENTIFICATION SYSTEM," which is a continuation of U.S. patent application Ser. No. 15/622,468, filed Jun. 14, 2017, entitled "UNIVERSAL VISITOR IDENTIFICATION SYSTEM," which is a continuation of U.S. patent application Ser. No. 14/629,989, filed Feb. 24, 2015, entitled "UNIVERSAL VISITOR IDENTIFICATION SYSTEM," which is a divisional of U.S. patent application Ser. No. 14/532,771, filed Nov. 4, 2014, entitled "UNIVERSAL VISITOR IDENTIFICATION SYSTEM," which claims priority under 35 U.S.C. § 119(e) as a nonprovisional application of the following U.S. Provisional Application:

| App. No. | Filing Date | Title |
| --- | --- | --- |
| 61/900,274 | Nov. 5, 2013 | UNIVERSAL VISITOR IDENTIFICATION SYSTEM |

In addition, this application is related to U.S. application Ser. No. 14/149,717, filed Jan. 7, 2014, titled "Content Site Visitor Processing System" U.S. application Ser. No. 14/151,700, filed Jan. 9, 2014, titled "Combined Synchronous and Asynchronous Tag Deployment," and U.S. application Ser. No. 14/525,031, filed Oct. 27, 2014, titled "System for Prefetching Digital Tags." The disclosures of each of the foregoing applications are hereby incorporated by reference in their entirety. Further, any subset of the embodiments described herein can be implemented in combination with any subset of the embodiments described in the foregoing applications.

BACKGROUND

Some operators of content sites, such as websites, regularly obtain the results of analytics performed with regard to user interactions on their content sites. User analytics can include any type of data regarding interactions of end users with content sites, among other types of data. There are different approaches to gathering analytics data, one of which includes employing the use of tags.

Tags can include small pieces of website code that allow a website operator to measure traffic and visitor behavior, understand the impact of online advertising and social channels, use remarketing and audience targeting, or test and improve a content site, among optionally other functions. Adding tags to a content site has typically required involving a developer to manually insert tag code into one or more pages of a website.

BRIEF DESCRIPTION OF THE DRAWINGS

Throughout the drawings, reference numbers are re-used to indicate correspondence between referenced elements. The drawings are provided to illustrate embodiments of the features described herein and not to limit the scope thereof.

FIG. 7 depicts an embodiment of a reporting user interface.

DETAILED DESCRIPTION

I. Tag Management Overview

Figure 1:
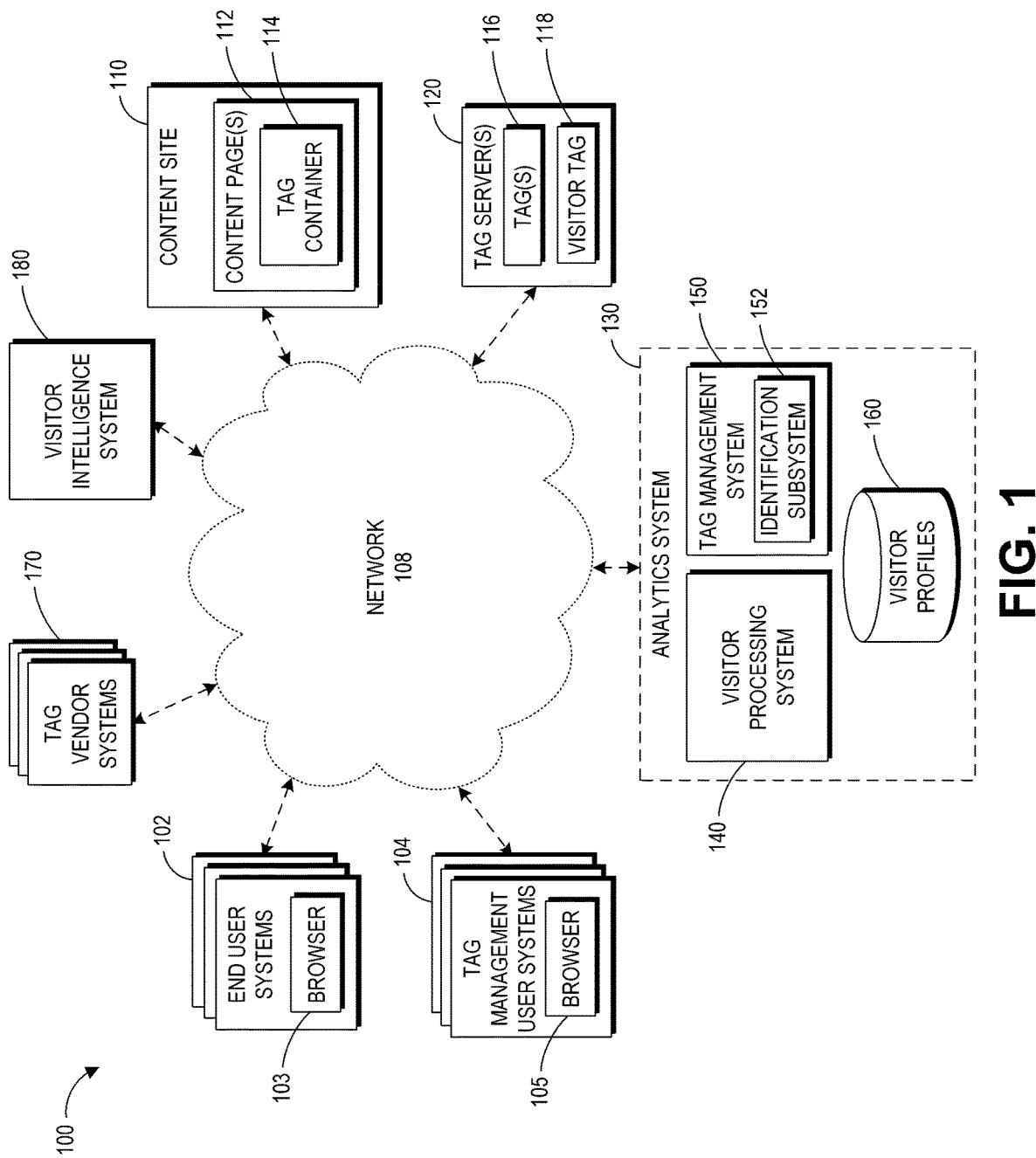
FIG. 1 depicts an embodiment of a computing environment that provides access to an analytics system, a visitor intelligence system, and tag vendor systems.

Adding tags to web pages without efficient management can create significant problems and inconveniences. For instance, code associated with multiple tags can bog down a content site and can be a major performance drain. Redundant or incorrectly applied tags can also distort measurements and result in duplicate costs or missing data. Poor tag management can also be time consuming for the information technology (IT) department or webmaster team to add new tags, which may mean that important measurement and marketing programs might be significantly delayed.

Tag management systems have recently been introduced to improve the management of tags. In one embodiment, a tag management system can deploy a single tag or a tag container to a content site. Each page or any subset of pages in the content site can incorporate the tag container as a universal tag that can be used to gather any type of visitor data of a visitor to a content site. This tag container can be used to interface with any number of third party vendor tags without requiring, in certain embodiments, such tags to be coded expressly in the code of the content pages (such as web pages) of the content site. Thus, changes to the tagging of a content site may be made through a user interface provided by the tag management system without having to use a developer to add the tags to the content pages manually. As a result, the tag management system can be more accessible to people without IT or programming knowledge.

This tag container approach to tag management can promote high scalability and provide marketing agility, enabling marketers and other tag management users to rapidly change data collected or analyzed by the tag management system. Further, since one tag container is embedded within the content pages in certain embodiments, the content pages may load faster and, therefore, include many performance improvements. Moreover, there may be reduction of IT costs provided by using the disclosed tag management system because IT personnel can shift away from performing tag management work to focusing on IT work.

II. End User Identification Via Tag Management

Tags can provide data about content site visitors to a variety of analysis systems hosted by third-party tag vendors. These analysis systems may include, for example, data management platforms (DMP) or web analytics systems that perform vendor-specific processing on the data to obtain insights about visitors to a content site. These analysis systems often operate independently of one another from vendor to vendor and specialize in providing different insights from the collected data. After the analysis systems complete their processing, a provider of the content site can access reports on the processed data from the analysis systems and evaluate the reports to assist with making business decisions, such as how to manage the content site or advertise to its visitors. Increasingly, content site providers are also requesting the raw data from third-party tag vendors so that the providers can perform their own processing to obtain further insights about visitors to their content sites.

In currently-available systems, the processed data is often given to the content site provider in an aggregated form. The processed data may be organized according to individual tag vendor approaches, making it difficult if not impossible to determine which portions of the processed data relate to any particular visitor. It can thus also be exceedingly challenging to determine what portions of the processed data from different tag vendors relate to the same visitor. Moreover, even if tag vendors provide the raw collected visitor data to content site providers, different tag vendors tend to use different identification schemes to identify the site visitors. It is therefore often impossible or highly difficult to correlate this siloed data on each visitor across tag vendors. Consequently, neither the processed data nor the raw data from different tag vendor systems can be easily evaluated or compared on an individual visitor basis, and thus important insights about visitors to content sites may be lost.

This disclosure describes embodiments of a tag management system that can include features that facilitate developing a cross-vendor profile for individual visitors of a content site. For instance, the tag management system may enable tag management users to deploy an identifier tag accessible from content pages of a content site that can facilitate creation of a universal identifier for visitors of the content site or even across content sites. Thus, each visitor system to the content page may have a unique universal identifier. One or more other third party tags associated with the tag container can pass this universal identifier to multiple tag vendor systems along with visitor data. The tag vendor systems may use the universal identifier provided with the visitor data to separately track visitor data related to individual visitors. As a result, the tag vendor systems can associate processed data that may be based in part on particular visitor data with corresponding individual universal identifiers and visitors. In turn, when the processed or raw visitor data is gathered by a provider of the content site from the tag vendor systems, the provider of the content site can evaluate the gathered data using the universal identifiers. The content site can thereby develop a cross-vendor profile for individual visitors and extract significant insights that may otherwise be missed using conventional systems. In certain embodiments, such a cross-vendor profile additionally can desirably be developed without relying on a visitor to log in or provide personally identifiable information (such as an email address, member number, or the like). As used herein, the term "universal identifier," in addition to having its ordinary meaning, can signify the capability to use an identifier with every content site throughout an entire domain or across multiple domains, such as over an entire network (e.g., the Internet) or optionally some subset thereof, such that the identifier is usable to uniquely identify an end user device or an end user.

In an embodiment, a method of identifying user data associated with a user of a content page can be performed under control of a physical computing device including digital logic circuitry. The method can include: receiving a content page from a content site, the content page including a data collection tag container that references a plurality of tags stored on a tag server, the plurality of tags comprising a first tag including first instructions and a second tag including second instructions; requesting, from the tag server, the plurality of tags referenced by the data collection tag container; programmatically executing the first instructions of the first tag and the second instructions of the second tag; according to the first instructions, obtaining an identifier usable by the content site to identify the physical computing device, and modifying a portion the content page to include the identifier to enable the second tag that does not have native access to the identifier to access the identifier by reading the modified portion of the content page; and according to the second instructions, obtaining the identifier from the modified portion of the content page and user data indicative of interactions with the content site, and transmitting the identifier and the user data to a plurality of processing systems, thereby enabling the plurality of processing systems to associate the user data with the identifier.

The method of the preceding paragraph can include one or more of the following features: The modifying can include adding the identifier to a data layer or a data object associated with a document object model (DOM) of the content page. The obtaining the identifier usable by the content site to identify the physical computing device can include generating the identifier using an algorithm. The obtaining the identifier usable by the content site to identify the physical computing device can include: transmitting a first cookie associated with the content site and a second cookie associated with an identification system to the identification system, the first cookie corresponding to a domain of the content site and a second cookie corresponding to a domain of the identification system; and in response to said transmitting the first and second cookies, receiving the identifier from the identification system. The first cookie can include a first-party cookie, and the second cookie can include a third-party cookie including the identifier.

In another embodiment, a method of identifying user data associated with a user of a content page can be performed under control of a user system comprising a physical computing device including digital logic circuitry. The method can include: receiving a first identifier tag and a plurality of first digital tags, the first identifier tag and the plurality of first digital tags associated with a first content page received from a first content site; programmatically executing the first identifier tag to obtain an identifier for the user system and to modify the first content page to include the identifier; programmatically executing the plurality of first digital tags to obtain the identifier from the modified first content page and first additional analytics data associated with the first content page and to transmit the identifier and the first additional analytics data to remote computing systems.

The method of the preceding paragraph can include one or more of the following features: The transmission of the identifier to the remote computing systems can enable a provider of the first content site to aggregate by the identifier data determined by the remote computing systems based on the first additional analytics data. The executing the first identifier tag can include executing the first identifier tag to modify the first content page to add the identifier to a data object or a data layer of the first content page. The obtaining the identifier for the user system can include determining the identifier using an identifier generation algorithm. The obtaining the identifier for the user system can include determining the identifier by looking up the identifier in a data file stored on the user system and associated with the first content site. The data file can include a cookie. The method can further include: receiving a second identifier tag and a plurality of second digital tags, the second identifier tag and the plurality of second digital tags associated with a second content page received from a second content site; programmatically executing the second identifier tag to obtain the identifier from an identification system separate from the user system and to modify the second content page to include the identifier; and programmatically executing the plurality of second digital tags to obtain the identifier from the modified second content page and second additional analytics data associated with the second content page and to transmit the identifier and the second additional analytics data to the remote computing systems. The first content site can correspond to a first domain different from a second domain to which the second content site corresponds. The obtaining the identifier from the identification system can include: transmitting, to the identification system, a first data file associated with the second content site and a second data file including the identifier and associated with the identification system; and in response to said transmitting the first and second data files, receiving the identifier from the identification system.

In yet another embodiment, a system for identifying user data associated with a user of a content page is disclosed. The system can include one or more memory devices and one or more hardware processors in communication with the one or more memory devices. The one or more memory devices can be configured to store: a first identifier tag and a plurality of first digital tags, the first identifier tag and the plurality of first digital tags associated with a first content page received from a first content site, and an identifier for the user system and the first content site. The one or more hardware processors can include digital logic circuitry configured to: programmatically execute the first identifier tag to modify the first content page to include the identifier, and programmatically execute the plurality of first digital tags to obtain the identifier from the modified first content page and first additional analytics data associated with the first content page and to transmit the identifier and the first additional analytics data to remote computing systems.

The system of the preceding paragraph can include one or more of the following features: The digital logic circuitry can be configured to programmatically execute the first identifier tag to modify the first content page to add the identifier to a data object or a data layer of the first content page. The digital logic circuitry can be configured to obtain the identifier for the user system by determining the identifier using an identifier generation algorithm. The digital logic circuitry can be configured to obtain the identifier for the user system by looking up the identifier in a data file stored on the user system and associated with the first content site. The data file can include a cookie. The one or more memory devices can be further configured to: store a second identifier tag and a plurality of second digital tags, the second identifier tag and the plurality of second digital tags associated with a second content page received from a second content site; and the digital logic circuitry can be further configured to: programmatically execute the second identifier tag to obtain the identifier from an identification system separate from the user system and to modify the second content page to include the identifier, and programmatically execute the plurality of second digital tags to obtain the identifier from the modified second content page and second additional analytics data associated with the second content page and to transmit the identifier and the second additional analytics data to the remote computing systems. The first content site can correspond to a first domain different from a second domain to which the second content site corresponds. The digital logic circuitry can be configured to obtain the identifier from the identification system by: transmitting, to the identification system, a first data file associated with the second content site and a second data file including the identifier and associated with the identification system; and in response to said transmitting the first and second data files, receiving the identifier from the identification system.

For purposes of summarizing the disclosure, certain aspects, advantages and novel features of several embodiments are described herein. It is to be understood that not necessarily all such advantages can be achieved in accordance with any particular embodiment of the embodiments disclosed herein. Thus, the embodiments disclosed herein can be embodied or carried out in a manner that achieves or optimizes one advantage or group of advantages as taught herein without necessarily achieving other advantages as may be taught or suggested herein.

III. Example Visitor Processing Systems and Methods

Turning to FIG. 1, an embodiment of a computing environment 100 is shown for implementing various tag features, including some or all of the identification and tag management features described above. In the computing environment 100, one or more end user systems 102 communicate over a network 108 with a content site 110. The end user systems 102 can include any form of computing device and may be desktops, laptops, smartphones, tablets, or the like. A browser 103 or other application software installed in the end user systems 102 accesses one or more content pages 112 of the content site 110. The content pages 112 may be web pages or other documents or files that may be accessed remotely and provided to the end user systems 102. Accordingly, the content pages 112 may be web pages, documents (e.g., .pdf documents), videos, images, text, combinations of the same, or the like. The content site 110 may be a website, a web server, an application server, a database server, combinations of the same, or the like. Further, the network 108 can include a local area network (LAN), a wide area network (WAN), a company intranet, the public Internet, combinations of the same, or the like.

As shown, one or more content pages 112 of the content site 110 can include a tag container 114. The tag container 114 can be an example of the tag container described above and can be a universal tag that is installed or incorporated in one or more content pages 112 in place of, or instead of, incorporating numerous tags in each page. The tag container 114 can communicate with one or more data collection tags 116, 118 (sometimes referred to as digital marketing tags or simply digital tags) implemented on one or more tag servers 120. Both the content site 110 and the tag servers 120 can be implemented in computer hardware and/or software. The tags 116, 118 can include third-party tags 116 provided by tag vendors that are different entities than an operator of, or provider of, the tag container 114. In addition, the tags 116, 118 can include a visitor tag or tags 118 that can be provided by the same provider as the provider of the tag container 114 (or a different provider in some embodiments). Upon execution in the browser 103, the tags 116, 118 can supply visitor identification or other data to a visitor processing system 140, a tag management system 150, or tag vendor systems 170 (optionally through the tag servers 120). In some embodiments, the tag container 114 can be considered a tag, even if the tag container 114 merely calls other tags for execution. Also, the tag container 114 can collect data in addition to calling other tags in some embodiments.

An analytics system 130 is shown in communication with the tag servers 120. The analytics system 130 can be implemented in computer hardware and/or software. For instance, the analytics system 130 may be implemented in physical and/or virtual servers, which may be geographically dispersed or co-located. In the depicted embodiment, the analytics system 130 includes the visitor processing system 140 and the tag management system 150, as well as a visitor profile data repository 160. The tag management system 150 also includes an identification subsystem 152. The visitor processing and tag management systems 140, 150 are shown separately for illustrative purposes, although their functionality may be implemented by a single system. The analytics system 130 can also be implemented without the tag management system 150, and thus, the functionality of the visitor processing system 140 can be implemented independent of any tag management or identification functionality. Further, the analytics system 130 can be implemented without the visitor processing system 140, and thus, the functionality of the tag management system 150 can be implemented independent of any visitor processing functionality.

In certain embodiments, the visitor processing system 140 can enable tag management users to configure the types of data tracked for different visitors of the content site 110, as well as analyze and report on this visitor data. For instance, in one embodiment, the visitor processing system 140 can provide one or more user interfaces that enable customization of collecting information about visitors to the content site 110. This information can be obtained initially by the visitor tag(s) 118, which may be provided through the tag container 114 to the end user systems 102 for execution in the browser 103. Upon execution in the browser 103, the visitor tag(s) 118 can supply visitor data to the visitor processing system 140 (optionally through the tag servers 120). Such visitor data can be stored in visitor profiles in the visitor profile data repository 160, which may include physical computer storage. Tag management users can subsequently query the visitor profiles to obtain reports or other information about visitors to the content site 110.

The tag management system 150 can be used to manage the tags 116 provided by third-party vendors. For instance, the tag management system 150 can provide functionality for tag management users to select which third-party vendor tags 116 to associate with the tag container 114 for a variety of vendor-specific processing purposes. These purposes can include obtaining analytics for data analysis or business intelligence, tracking affiliate activity with respect to the content site 110, obtaining user data for displaying targeted ads, obtaining user data for customizing search functionality or email campaigns targeted to the end users, obtaining user data for personalizing content of the content pages 112, obtaining user data for integration with social networking functionality, obtaining user data for big data analysis, combinations of the same, or the like. Tags for any of these vendor-specific processing purposes, among others, can be considered digital tags. Data collected by the tags 116 can be provided to tag vendor systems 170, which can perform any of this vendor-specific processing. The data or related data may additionally or alternatively be passed to the tag vendor systems 170 through the content site 110, the tag server 120, or the tag management system 150.

In an embodiment, the tag management system 150 provides functionality (such as one or more user interfaces) for tag management users to map data sources in the content pages 112 to data sources gathered by the third-party vendor tags 116. For instance, if one of the content pages 112 includes a shopping cart value named "cart value," the tag management system can provide a user interface that enables a user to tell the tag management system 150 to collect data on the "cart value" and map this data to a "cart_value" variable of one of the tags 116. In addition, the tag management system 150 can provide similar functionality for identifying which data sources of the content pages 112 are to be gathered by the visitor tag 118.

However, in some embodiments, the visitor tag 118 can instead perform a greedy collection of some or all data available in the content page(s) 112. Since the visitor tag 118, tag container 114, and visitor processing system 140 can be provided by the same entity, the data obtained by the visitor tag 118 need not be mapped to third-party mappings like the data obtained by the third-party tags 116. Instead, some or all of the data available to the visitor tag 118 can be provided to the visitor processing system 140 for processing. Thus, the visitor tag 118 can facilitate vendor-neutral data gathering of some or all of the data elements in a content page 112. Since this data may not be mapped to a vendor-specific format in certain embodiments, the data can be exported to business intelligence systems, such as visitor intelligence system 180, without a need to massage the data from its mapped form (which can be cumbersome) to its original, raw form.

The browser 103 can execute an identification tag (e.g., the visitor tag 118) of the tags 116, 118. The identification tag may include a script or the like that causes the browser 103 to obtain a universal identifier and update the content page 112 with the universal identifier. The universal identifier can uniquely identify the end user system 102 to the content site 110. In some embodiments, upon execution of the universal identification tag, the browser 103 can obtain the universal identifier by generating the universal identifier or retrieve the universal identifier from a locally-stored data file. Additionally or alternatively, the browser 103 can obtain the universal identifier by sending visitor identification or other data via the network 108 to an identification subsystem 152 of the tag management system 150. In turn, the identification subsystem 152 can use the received information to provide the universal identifier and transmit the universal identifier to the browser 103 via the network 108. Once the universal identifier is obtained, the identification tag can update the code of the content page 112 to include the universal identifier. Upon execution of one or more of the tags 116, 118, the universal identifier updated in the code of the content page 112 may then be provided to the visitor processing system 140 or the tag vendor systems 170, along with the data about the end user system 102 collected by the tags 116, 118, enabling the collected data to be identifiable during and after processing by the visitor processing system 140 or the tag vendor systems 170.

The systems 140, 170 can utilize the universal identifiers provided by the tags 116, 118 to associate particular raw visitor data and processed data with individual universal identifiers. The systems 140, 170, for example, can separately process the collected data associated with individual universal identifiers. Upon completion of the processing, the processed data may be kept separate according to the individual universal identifiers. In another example, the systems 140, 170 compile or transform the raw visitor data associated with multiple universal identifiers and attribute any determined processed data based on the raw data to each of the multiple individual identifiers.

The systems 140, 170 can provide the processed data to a visitor intelligence system 180, which may be owned, operated, or otherwise used by an operator of the content site 112 to analyze site visitor behavior. The visitor intelligence system 180 can be implemented in computer hardware and/or software. The visitor intelligence system 180 can receive the raw data or processed data from the systems 140, 170 and store and manage the data in a way that facilitates a meaningful presentation of information to those interested in the performance of the content page 112 of the content site 110. In addition, the visitor intelligence system 180 may organize the presentation of the information according to one or more universal identifiers so that a cross-vendor understanding of visitors of the content page 112 may be provided. In certain embodiments, such an approach advantageously enables the visitor intelligence system 180 to present a more complete picture of individual visitors and facilitates joining or evaluating disparate processed data sets from the systems 140, 170 using the commonly assigned universal identifiers. Moreover, this approach can provide flexibility and customization options for consumers of the information by enabling the information to be viewed according to groups of visitors or according to specific characteristics of individual visitors. In some embodiments, the visitor intelligence system 180 is part of the visitor processing system 140 or the tag management system 150 rather than separate as illustrated in FIG. 1.

Various tag management user systems 104 can access the tag servers 120, the analytics system 130, or the visitor intelligence system 180 via the network 108. Like the end user systems 102, the tag management user systems 104 can include a browser 105 or other application software that can access network applications over the network 108. The tag management user systems 104 can also be any type of computing device including, but not limited to, a desktop, laptop, tablet, smartphone, or the like. The tag management user systems 104 can be operated by tag management users such as marketing professionals, website operators, business users, operators of the content site 110, or any other individual who uses tags or data obtained from tags. Tag management users are not the end users of the content site 110 in certain embodiments. A tag management user might use a tag management user system 104 to dynamically update the types of data tracked or analyzed for different visitors of the content site 110. This data can be tracked by the visitor processing system 140 via either updating the visitor tag 116 stored on the tag server 120 or by updating processing of data obtained from the visitor tag 116 to build updated visitor profiles 160. In addition, tag management users can access the information stored in the visitor intelligence system 180 to obtain a cross-vendor understanding of particular end user systems for purposes such as evaluating the effectiveness of various marketing campaigns, for instance.

Figure 2:
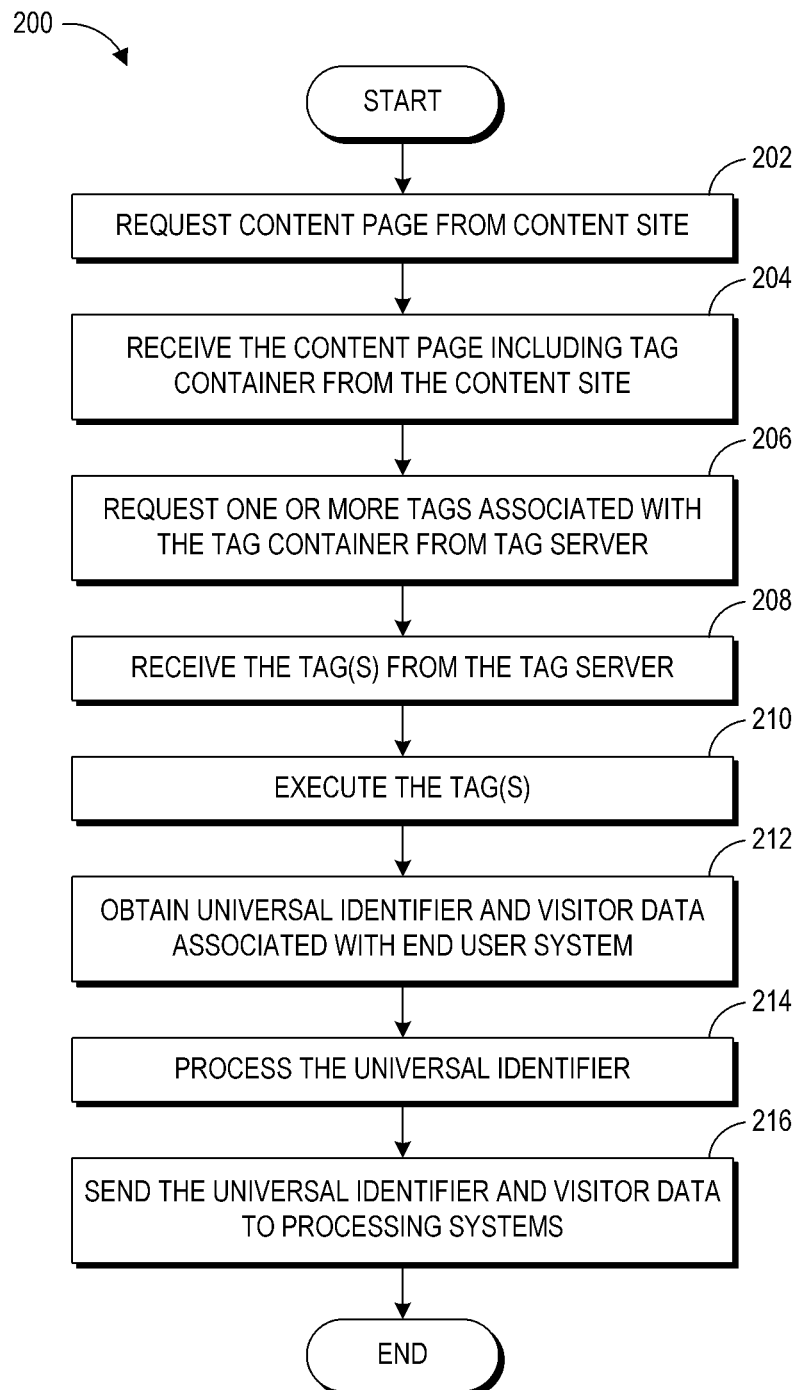
FIG. 2 depicts an embodiment of a universal identifier end user system process.

Turning to FIG. 2, an embodiment of a universal identifier end user system process 200 is shown. The process 200 illustrates an example mode of operation of the computing environment 100 of FIG. 1 and may be implemented by the various components shown in the computing environment 100 of FIG. 1. For convenience, the process 200 is described in the context of the computing environment 100 but may instead be implemented by other systems described herein or other computing systems not shown. The process 200 provides one example approach by which the end user system 102 can obtain a universal identifier for identifying visitor data related to the end user system's interactions with the content site 110.

At block 202, an end user system 102 can request content such as a content page 112 from the content site 110. The end user system 102 may receive the content page 112 including a tag container 114 at block 204. Receipt of the content page 112 may further initiate the creation or updating of a piece of data, such as a cookie, associated with the browser 103 of the end user system 102 and usable to store data about end user system interactions with the content site 110. At block 206, the end user system 102 can request one or more tags 116, 118 associated with the tag container 114 from a tag server 120. The tag container 114 may include script code such as JavaScript code or the like embedded in the source of the content page 112 initially requested by the end user system 102. The script can reference one or more tags 116, 118. The tag container 114, upon being processed by the browser 103, can programmatically access the tag(s) 116 or 118 (or other tag) stored on the tag server 120 to request the tag(s) 116 or 118 to be provided or downloaded to the end user system 102. The tag(s) 116, 118 may each be a static file or the like that includes executable code such as HTML code and/or script code, such as JavaScript or the like.

The tag(s) 116 or 118 can be received at block 208 at the end user system 102, and the tag(s) 116 or 118 can be executed at block 210 by the end user 102 system. Upon execution of the tag 118, at block 212, the browser 103 can obtain a universal identifier associated with the end user system 102. The way in which this universal identifier is obtained can be based at least on whether the end user system 102 has previously visited the content site 110 or one or more other settings or criteria. In certain embodiments, the end user system 102 can determine whether the end user system 102 previously visited the content site 110 according to whether a first-party cookie may be stored on the end user system 102. In other embodiments, the end user system 102 can determine whether the end user system 102 previously visited the content site 110 based on whether the first-party cookie stores a particular type of identification or value, such as a universal identifier from the identification subsystem 152.

In some embodiments, when the end user system 102 has not previously visited the content site 110, the browser 103 can locally generate a universal identifier for the end user system 102 using an algorithm, a lookup table, or the like. The locally generated universal identifier can be based at least on one or more of a media access control (MAC) address, Internet Protocol (IP) address, browser user agent, or the like associated with the end user system 102 or browser 103. Additionally or alternatively, the browser 103 can send identification data associated with the end user system 102 to the identification subsystem 152. For example, the browser 103 can send one or more first-party or third-party cookies including a tracking identifier to the identification subsystem 152. The first-party or third-party cookie may, in some embodiments, include the generated universal identifier, which the identification subsystem 152 can store. A "first-party cookie," in addition to having its ordinary meaning, as used herein can include a cookie belonging to the same domain as the content site 110. A "third-party cookie," in addition to having its ordinary meaning, as used herein can include a cookie belonging to a domain other than the domain of the content site 110, like the domain of the identification subsystem 152. Third-party cookies are described in greater detail below. The identification subsystem 152, in response to the identification data, can transmit a universal identifier associated with the end user system 102, and the end user system 102 can receive the universal identifier. In some embodiments, the identification subsystem 152 can provide the identifier included in the received first-party or third-party cookie as the universal identifier.

In some embodiments, when the end user system 102 has previously visited the content site 110, the tag 118 can obtain the universal identifier from a first-party cookie stored on the end user system 102. The end user system 102, in such cases, may presume that a tracking identifier of the first-party cookie can be the universal identifier for the end user system 102.

The browser 103 can process the universal identifier at block 214 according to the executable code of the tag 118. The browser 103 can, for instance, assign the universal identifier as a unique visitor identifier for the content site 110 to use when tracking interactions between the content site 110 and the end user system 102. In addition, the tag 118 may update or modify the content page 112 to include the universal identifier, such as by updating the Document Object Model (DOM) of the content page 112. For instance, the tag 118 may add the universal identifier to a data object or data layer of the content page 112 (e.g., the document object model (DOM) thereof), sometimes referred to herein as a universal data object (UDO). By updating or modifying the content page 112 with the universal identifier, the tags 116, 118 that may not have native access to the universal identifier can access the identifier by reading the modified portion of the content page. One or more of the tags 116, 118 can also add the identifier value to a first-party or third-party cookie, such as in a tracking identifier of the first-party or third-party cookie, for later reference.

Additionally, at block 212, upon execution of one or more of the tags 116, 118, the browser 103 can obtain the universal identifier and visitor data about the end user system 102. The universal identifier and visitor data can be retrieved, for example, by reading a portion of the content page or accessing data stored in a first-party or third-party cookie. The visitor data can include any of a variety of information about the end user system 102 and the end user system's interactions with the content site 110. For instance, the visitor data may include information about what type of browser 103 or application used to access the content site 110. The visitor data may also include information about a geographic location of the user, a duration that the user accessed the content site 110 or logged into the content site, or the like. In addition, the visitor data can include information about any interaction by the visitor with the content site 110 including, for example, any clicks made by the visitor on links on the content page 112 served by the content site 110, any user selection of a form element, or any user scroll behavior, text entry behavior in form text boxes, chat boxes, e-mail boxes, social networking, other user interaction with other user interface controls, combinations of the same, or the like.

At block 216, the browser 103 can send the universal identifier and some or all of the visitor data to processing systems like the visitor processing system 140 or the tag vendor systems 170, according to the executable code of one or more of the tags 116, 118. The universal identifier can be sent in association with the visitor data so that the visitor data attributable or related to the universal identifier may be understood as attributable or related to the universal identifier by the systems 140, 170. As a result, after the visitor data may be processed by the systems 140, 170, the processed data can be collected and evaluated using the universal identifier to determine the processed data from each of the systems 140, 170 that is related to the universal identifier.

In certain embodiments, the process 200 is notably different than a traditional process for utilizing a cookie of the browser 103. In a traditional process, when the content page 112 is requested by the end user system 102, a cookie stored on the end user system 102 and associated with the content page 112 may be sent to the content site 110. The content site 110, in response, can send a version of the content page 112 that is tailored based on the information contained in the cookie, such as shopping cart contents, button clicks, and previously visited pages. In contrast, according to some embodiments of the process 200, the end user system 102 can send identification data, such as one or more cookies, associated with the end user system 102 to the identification subsystem 152. The identification subsystem 152, in response, can transmit a universal identifier to the end user system 102. When the tag 118 may process the universal identifier, the tag 118 can update or modify the earlier downloaded content page 112 to include this universal identifier.

Figure 3:
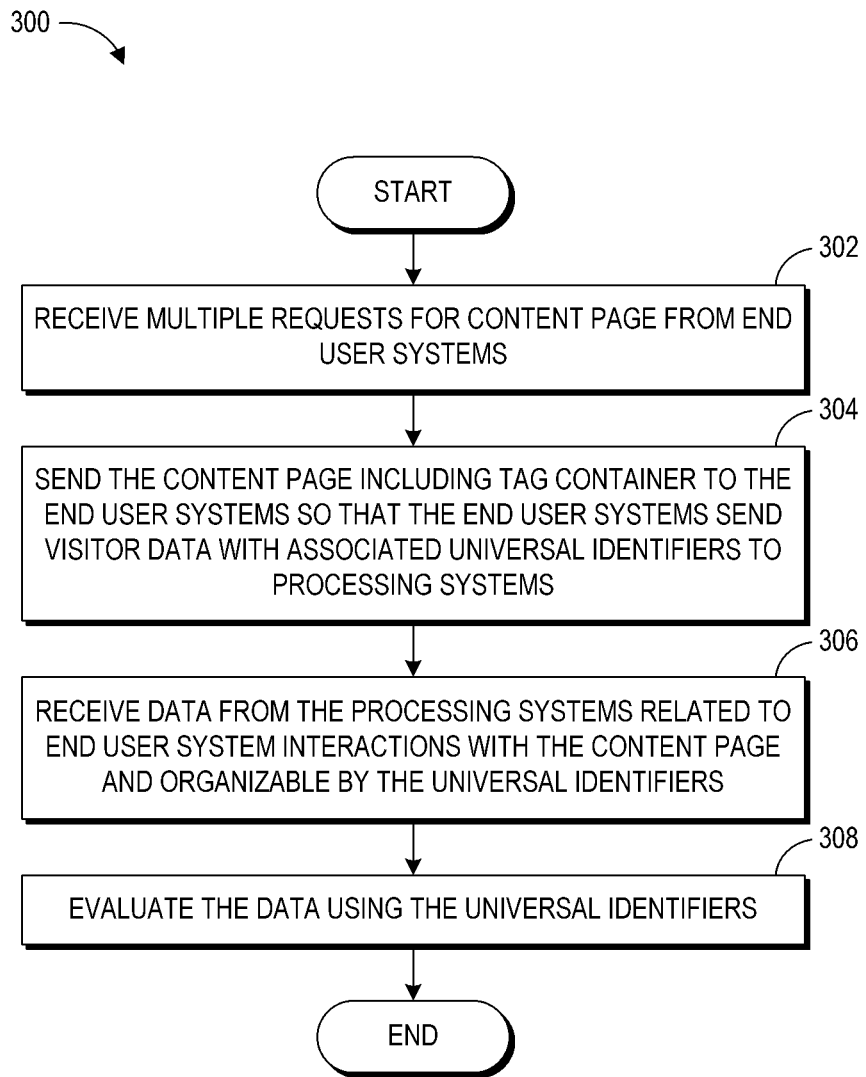
FIG. 3 depicts an embodiment of a universal identifier content management system process.

FIG. 3 depicts an embodiment of a universal identifier content management system process 300. The process 300 illustrates an example mode of operation of the computing environment 100 of FIG. 1 and may be implemented by the various components shown in the computing environment 100 of FIG. 1. For convenience, the process 300 is described in the context of the computing environment 100 but may instead be implemented by other systems described herein or other computing systems not shown. The process 300 provides one example approach by which the content site 110 and the visitor intelligence system 180 together can enable visitors to the content site 110 to be uniquely identified, facilitating the evaluation of processed or raw data from the visitor processing system 140 and the tag vendor systems 170 on an individual visitor basis.

At block 302, the content site 110 can receive multiple requests for the content page 112 from the end user systems 102. In response, at block 304, the content site 110 can send the content page 112 including a tag container 114 to the end user systems 102, causing the end user systems 102 to send visitor data with associated universal identifiers to multiple processing systems. For example, as described with respect to the process 200, when the tag containers 114 may be processed by the browsers 103 of the end user systems 102, the browsers 103 can access the tags 116, 118. Upon execution of one or more of the tags 116, 118, the browsers 103 can individually obtain a universal identifier usable for tracking interactions between the content site 110 and the end user systems 102. These universal identifiers and associated visitor data may then be provided to the processing systems, like the visitor processing system 140 or the tag vendor systems 170, according to one or more of the tags 116, 118.

At block 306, the visitor intelligence system 180 can receive data from the processing systems that can be related to end user system interactions with the content page 112 and organizable by the universal identifiers. The visitor intelligence system 180, for instance, can receive the processed data (as well as raw visitor data) from the visitor processing system 140 or the tag vendor systems 170. The processed data can include indications of portions of the processed data that can be attributable or related to one or more particular universal identifiers and thus one or more particular end user systems 102. The visitor intelligence system 180 can thereby evaluate the processed data using the universal identifiers at block 308 to facilitate, for example, consideration of the impact of actions reflected across multiple processed data sets from different providers. In one implementation, the visitor intelligence system 180 can present a report that lists processed data provided by multiple vendors, as shown in FIG. 7.

Figure 4:
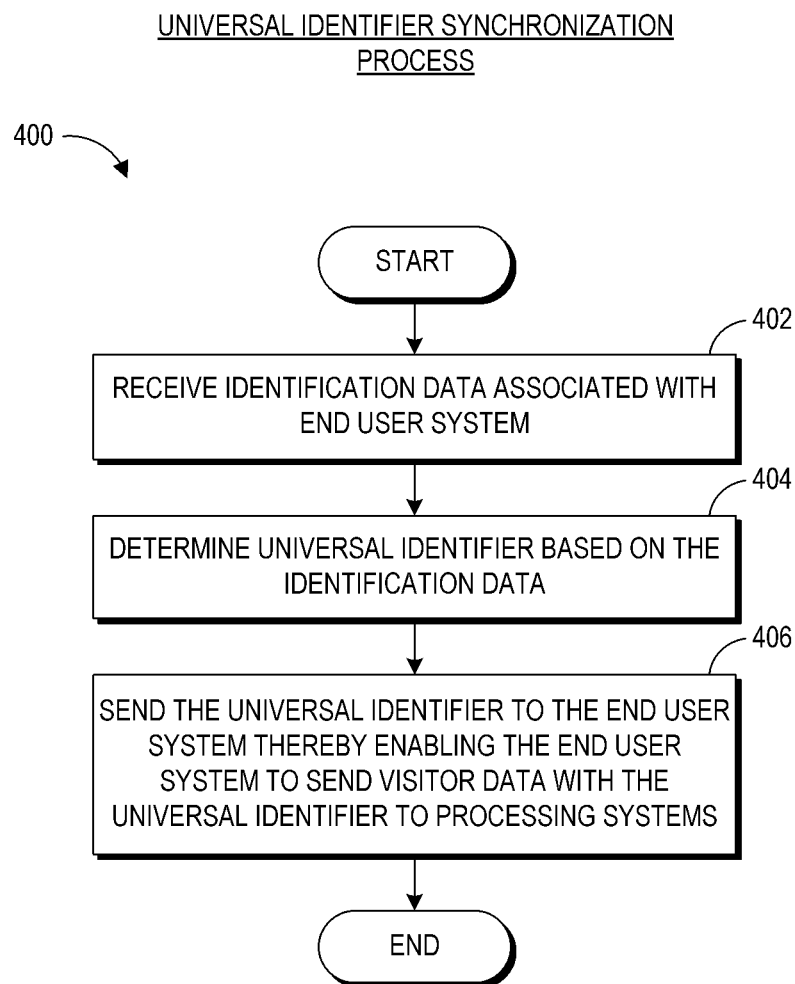
FIG. 4 depicts an embodiment of a universal identifier generation process.

FIG. 4 depicts an embodiment of a universal identifier generation process 400. The process 400 illustrates an example mode of operation of the computing environment 100 of FIG. 1 and may be implemented by the various components shown in the computing environment 100 of FIG. 1. For convenience, the process 400 is described in the context of the computing environment 100 but may instead be implemented by other systems described herein or other computing systems not shown. The process 400 provides one example approach by which the identification subsystem 152 can determine a universal identifier for identifying visitor data about an end user system's interactions with the content site 110.

At block 402, the identification subsystem 152 can receive identification data associated with the end user system 102 from the browser 103. The identification subsystem 152, for instance, can receive one or more first-party or third-party cookies, including tracking identifiers for the content site 110 or the identification subsystem 152.

The identification system 152 can use the identification data to determine a universal identifier at block 404. The universal identifier can be a unique visitor identifier for the content site 110 usable to track interactions between the content site 110 and the end user system 102. If a universal identifier associated with the end user system 102 has been previously determined by the identification system for the content site 110, the identification system can determine the same universal identifier for the end user system 102 so that interactions between the end user system 102 and the content site 110 can be easily tracked over time. In some embodiments, the identification system may adopt an identifier from the identification data provided by the end user system 102, such as the tracking identifier in a first-party or third-party cookie, or generate the universal identifier according to an algorithm, a lookup table, or the like.

In further embodiments, the identification subsystem 152 can selectively or periodically determine a new universal identifier for the end user system 102, such as when the identification system 152 determines that the universal identifier for the end user system 102 conflicts with a universal identifier for another end user system or to enhance security of the universal identifiers or related information over time. Moreover, in some embodiments, when a universal identifier may have been previously determined for the end user system 102 but for a different content site, the identification system 152 can determine the same universal identifier for the end user system 102 for both content sites such that interactions between the end user system 102 and both sites can be monitored, as described in greater detail with respect to FIG. 6. In certain embodiments, the identification subsystem 152 can additionally or alternatively manage different identifiers for the end user system 102 for one or more different content sites and track an association between the end user system 102 and the different identifiers to monitor the end user system 102 activity. For instance, the identification subsystem 152 can maintain a data structure such as a queue or list for the end user system 102 and add each of the different identifiers to the data structure with an indication of the associated one or more different content sites.

At block 406, the identification subsystem 152 sends the universal identifier to the end user system 102. The identification subsystem 152, for example, can send to the browser 103 one or more first-party or third-party cookies that include the universal identifier. Upon receipt of the universal identifier, the end user system 102 can send visitor data about the end user system 102 with the universal identifier to processing systems, such as the visitor processing system 140 or the tag vendor systems 170, thereby enabling the processing systems to associate the visitor data specifically with the end user system 102.

In certain embodiments, the identification subsystem 152 is advantageously implemented as a subsystem of the tag management system 150 of the analytics system 130. Since the analytics system 130 may already manage and configure the tags 116, 118 associated with the tag container 114, the tag management system 150 can be in the unique position to push the universal identifier to appropriate variables of the tags 116, 118. That is, the analytics system 130 can manage a mapping of the variables receivable by the visitor processing system 140 and the tag vendor systems 170 so that a minimal amount of coding may be used to implement the universal identifier for the content page 112. In some embodiments, the identification subsystem 152 can instead be part of one of the tag vendor systems 170 rather than a subsystem of the analytics system 130.

Figure 5:
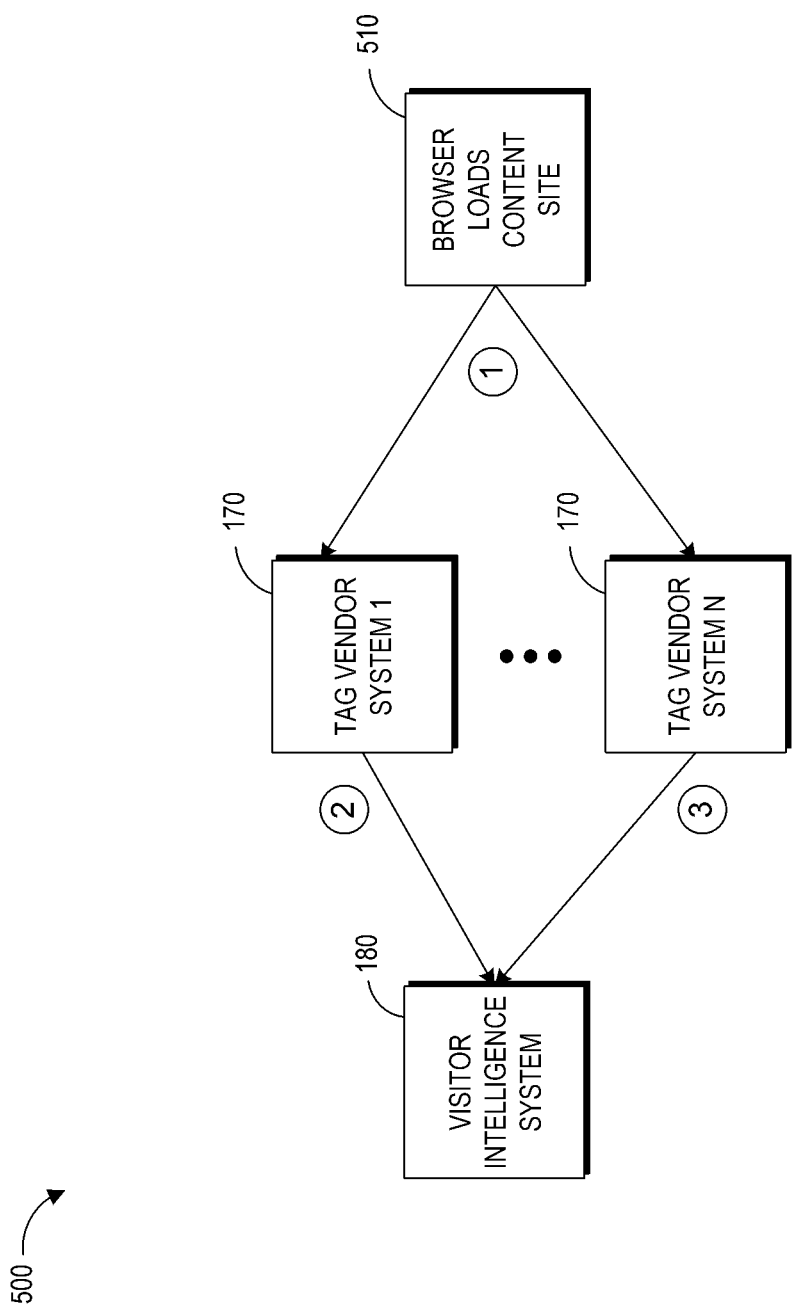
FIG. 5 depicts an embodiment of a computing environment for identifying visitors to a content site using the computing environment of FIG. 1.

FIG. 5 depicts an embodiment of a computing environment for identifying visitors to a content site using the computing environment of FIG. 1. The computing environment 500 includes a browser, such as the browser 103 of the end user system 102, in a state 510 where the browser loads a page of a content site. State transitions are represented by circled numbers in the diagram.

In response to the browser 510 loading the page of the content site, as described with respect to the process 200, the browser 510 can execute an identification tag of the page that causes the browser 510 to obtain or generate a universal identifier and update the page to include the obtained universal identifier. The browser 510 further can execute one or more tags of the page that cause the browser 510 to obtain the universal identifier from the updated page and to send visitor data along with the universal identifier to the tag vendor systems 170 via state 1. The universal identifier can be sent in association with the visitor data so that the visitor data attributable or related to the universal identifier can be understood as attributable or related to the universal identifier by the tag vendor systems 170.

The tag vendor systems 170 can process the visitor data and corresponding universal identifiers from the browser 510. One or more of the tag vendor systems 170 can, for instance, determine analytics for data analysis or business intelligence for the end user system 102, track affiliate activity with respect to the content site, obtain user data for the end user system 102 for displaying targeted ads, obtain user data for the end user system 102 for customizing search functionality or email campaigns targeted to the end user, obtaining user data for personalizing content of the page for the end user system 102, obtain user data for the end user system 102 for integration with social networking functionality, obtain user data for the end user system 102 for big data analysis, combinations of the same, or the like. The processed data from the tag vendor systems 170 can be transferred via states 2 and 3 to the visitor intelligence system 180. The visitor intelligence system 180 can accordingly organize or evaluate the processed data using the universal identifier of the end user system 102 or prepare a cross-vendor profile for the end user system 102.

Figure 6:
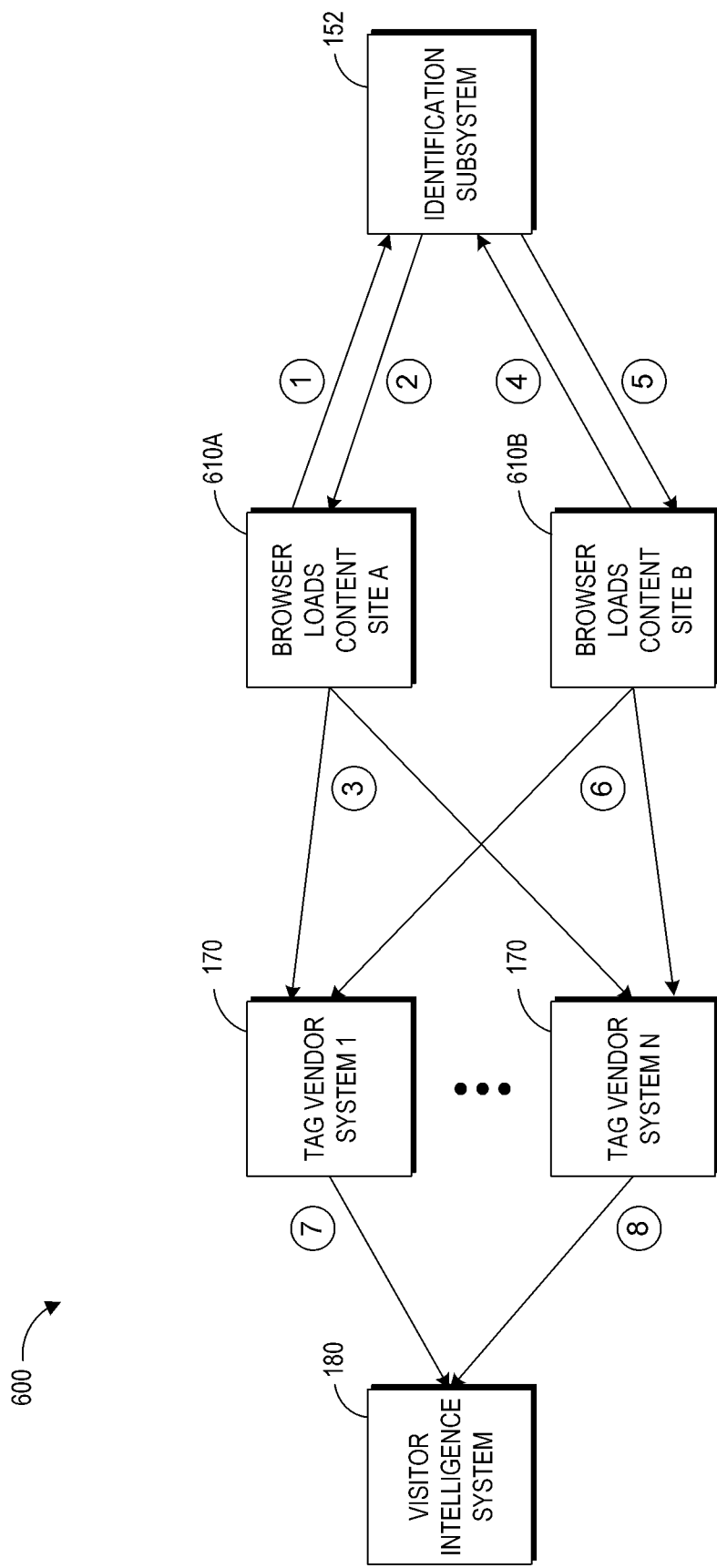
FIG. 6 depicts an embodiment of a computing environment for identifying visitors across different content sites using the computing environment of FIG. 1.

FIG. 6 depicts an embodiment of a computing environment 600 for identifying visitors across different content sites using the computing environment 100 of FIG. 1. The computing environment 600 includes a browser, such as the browser 103 of the end user system 102, in one state 610A where the browser loads a page of content site A and another state 610B where the browser loads a page of content site B. The content sites A and B can correspond to different domains owned or operated by the same content provider, in some embodiments. State transitions are represented by circled numbers in the diagram.

In response to the browser 610A loading the page of content site A, the browser 610A can execute an identification tag of the page of content site A that causes the browser 610A to send identification data, such as one or more first-party or third-party cookies associated with the browser 610A, to the identification subsystem 152 via state 1. The first-party cookie may be a cookie stored by the content site A on the browser's end user system 102 while the third-party cookie may be a cookie stored by the identification subsystem 152 on the browser's end user system 102. Each of the first-party and third-party cookies can include one or more tracking identifiers assigned to the end user system 102 by the provider of the cookie.

The identification subsystem 152 can receive the identification data and, in return, provide a corresponding universal identifier for the end user system 102 via state 2. In certain embodiments, the browser 610A provides at least a third-party cookie stored by the identification subsystem 152 on the end user system 102 to the identification subsystem 152. The identification subsystem 152 then returns a copy of this third-party cookie. If no third-party cookie has been stored by the identification subsystem 152 on the end user system 102 or if a third-party cookie may have been previously stored and was subsequently deleted from the end user system 102, the browser 610A can provide at least a first-party cookie stored by the content site A on the end user system 102 to the identification subsystem 152. The identification subsystem 152 subsequently returns a copy of a portion of the first-party cookie as a third-party cookie. After receiving the third-party cookie from the identification subsystem 152, the browser 610A can treat the tracking identifier in the received third-party cookie as the universal identifier and accordingly transfer this tracking identifier to a tracking identifier in the first-party cookie stored by the content site A. The browser 610A can additionally update the page of the content site A (e.g., the document object model (DOM) thereof) to include the universal identifier.

Upon execution of one or more tags of the content site A, the browser 610A obtains the universal identifier from the updated page of the content site A and sends visitor data, along with the universal identifier stored in the first-party cookie, to the tag vendor systems 170 via state 3. The universal identifier can be sent in association with the visitor data so that the visitor data attributable or related to the universal identifier can be understood as attributable or related to the universal identifier by the tag vendor systems 170.

In response to the browser 610B loading the page of content site B, the browser 610B can execute an identification tag of the page of content site B that causes the browser 610B to send identification data, such as one or more first-party or third-party cookies associated with the browser 610B, to the identification subsystem 152 via state 4. The first-party cookie can be a cookie stored by the content site B on the browser's end user system while the third-party cookie can be a cookie stored by the identification subsystem 152 on the browser's end user system. Each of the first-party and third-party cookies can include one or more tracking identifiers assigned to the end user system 102 by the provider of the cookie.

The identification subsystem 152 can receive the identification data and, in return, provide via state 5 the same corresponding universal identifier to the end user system 102 that was provided via state 2. In certain embodiments, the browser 610B provides at least a third-party cookie stored by the identification subsystem 152 on the end user system 102 to the identification subsystem 152. The identification subsystem 152 then returns a copy of this third-party cookie. After receiving the third-party cookie from the identification subsystem 152, the browser 610B can treat the tracking identifier in the received third-party cookie as the universal identifier and transfer this tracking identifier to a tracking identifier in the first-party cookie stored by the content site B. The browser 610B can additionally update the page (e.g., the DOM thereof) of the content site B to include the universal identifier.

Upon execution of one or more tags of the content site B, the browser 610B obtains the universal identifier from the updated page of the content site B and sends visitor data, along with the universal identifier stored in the first-party cookie, to the tag vendor systems 170 via state 6. The universal identifier can be sent in association with the visitor data so that the visitor data attributable or related to the universal identifier can be understood as attributable or related to the universal identifier by the tag vendor systems 170.

The tag vendor systems 170 can process the visitor data and corresponding universal identifiers from the browser in the states 610A and 610B. One or more of the tag vendor systems 170 can, for instance, determine analytics for data analysis or business intelligence for the end user system 102, track affiliate activity with respect to the content site A or B, obtain user data for the end user system 102 for displaying targeted ads, obtain user data for the end user system 102 for customizing search functionality or email campaigns targeted to the end user, obtaining user data for personalizing content of the content pages A and B for the end user system 102, obtain user data for the end user system 102 for integration with social networking functionality, obtain user data for the end user system 102 for big data analysis, combinations of the same, or the like. The processed data from the tag vendor systems 170 can be transferred via states 7 and 8 to the visitor intelligence system 180. The visitor intelligence system 180 can accordingly organize or evaluate the processed data using the universal identifier of the end user system 102 or prepare a cross-vendor profile for the end user system 102.

In certain examples discussed with respect to FIG. 6, the examples describe utilizing tracking identifiers of cookies to exchange a universal identifier or identification data. This implementation has been selected in part to address security limitations imposed in some computing environments. For instance, in some cases, a first-party cookie for a content site within one domain may not be accessed by a content site from a different domain. As a result, a third-party cookie associated with both domains can be used to keep the universal identifiers consistent between multiple content sites and domains as described with respect to FIG. 6. Accordingly, in other computing environments, one or more other approaches for requesting, determining, or transmitting the universal identifier and the identification data can instead be implemented.

In certain embodiments, one or more examples discussed with respect to FIG. 6 can be understood in contrast to a computing environment where an identification system shares a third-party cookie and relies on redirection, such as via a proxy functionality, to facilitate identification of end user systems. The one or more examples can instead rely on copying one or more values from a first-party or third-party cookie. As a result, the one or more examples can, in some instances, provide one or more of numerous advantages, including (1) removing a dependency on a redirection system that may be unavailable at times and thereby cause end user system identification to not be possible, (2) providing an identification source for end user systems via a mechanism other than a redirection system, (3) reducing a number of network communications (by avoiding sharing a cookie) and thereby reducing network latency and improving computing performance, (4) providing redundancy for identification of end user systems, and (5) providing an efficient, open architecture whereby an identifier may be widely accessed, such as by multiple digital tags provided by one or more vendors that may but need not include a provider of a tag management system.

FIG. 7 depicts an embodiment of a reporting user interface 700. The interface 700 can be output by the visitor intelligence system 180 for display by the browser 105 of the tag management user systems 104 for tag management users. The data included in the interface 700 may be supplied by the content site 110, the analytics system 130, the tag vendor systems 170, or the visitor intelligence system 180. In some embodiments, the visitor intelligence system 180 alone supplies the data shown in the interface 700. The interface 700 can advantageously, in certain embodiments, display cross-vendor information for particular universal identifiers associated with the content site 110 so that disparate processed data from the visitor processing system 140 and the tag vendor systems 170 may be shown relative to the same universal identifiers. The cross-vendor information can beneficially be used by the tag management users to evaluate the impact of previous visitor interactions with the content site 110 and plan approaches for future changes to the content site 110.

The interface 700 includes multiple selection options for controlling the data displayed in the interface 700. Using the "Select ID Group" drop-down 710, the tag management users can select to review data for a subset of universal identifiers associated with the content site 110. For instance, the interface 700 shows a subset group "Group 123" that includes universal identifiers ranging from 100,000 to 100,008. Using the "Select Attribute" drop-down 720, the tag management users can additionally select to review particular attributes for the selected subset of universal identifiers. For example, by selecting the "Advertising Characteristics" attribute, the interface 700 may display particular vendor metrics related to advertising characteristics of the universal identifiers.

As illustrated in FIG. 7, in some embodiments, the interface 700 can display three vendor metrics corresponding a subset of universal identifiers, where each vendor metric is provided by a different vendor. The three vendor metrics together can provide a more complete picture of the advertising characteristics for individual universal identifiers than any one of the vendor metrics individually. The Vendor 1 Metric can indicate a sensitivity of individual universal identifiers to certain types of advertising information. For example, the end user system 102 associated with a particular universal identifier may be more likely to make purchases when confronted with feedback about a product or service (i.e., a feedback-sensitive purchaser), when offered rush delivery options (i.e., a time-sensitive purchaser), or when offered discounts (i.e., a price-sensitive purchaser). The Vendor 2 Metric can indicate an interest or category preference associated with individual universal identifiers. For instance, the end user system 102 associated with a particular universal identifier may be more likely to make purchases when presented with advertisements related to sporting equipment, electronics, home and garden, beauty and health, or movies and music. The Vendor 3 Metric can indicate an assessment of the likely business value associated with individual user identifiers. For example, the end user system 102 associated with a particular universal identifier may be more likely to result in a relatively large profit (i.e., high value), a relatively average amount of profit (i.e., medium value), or a relatively small amount of profit (i.e., low value) when presented with an advertisement. Based on this information, tag management users can desirably tailor approaches and investments when advertising to individual end user systems.

The user interface controls shown in FIG. 7 are merely illustrative examples and can be varied in other embodiments. For instance, buttons, dropdown boxes, select boxes, text boxes, check boxes, slider controls, and other user interface controls shown may be substituted with other types of user interface controls that provide the same or similar functionality. Further, the user interface controls may be combined or divided into other sets of user interface controls such that similar functionality or the same functionality may be provided with very different looking user interfaces. Moreover, each of the user interface controls may be selected by a user using one or more input options, such as a mouse, touch screen input, or keyboard input, among other user interface input options.

IV. Detailed Example Computing Environment

Figure 8:
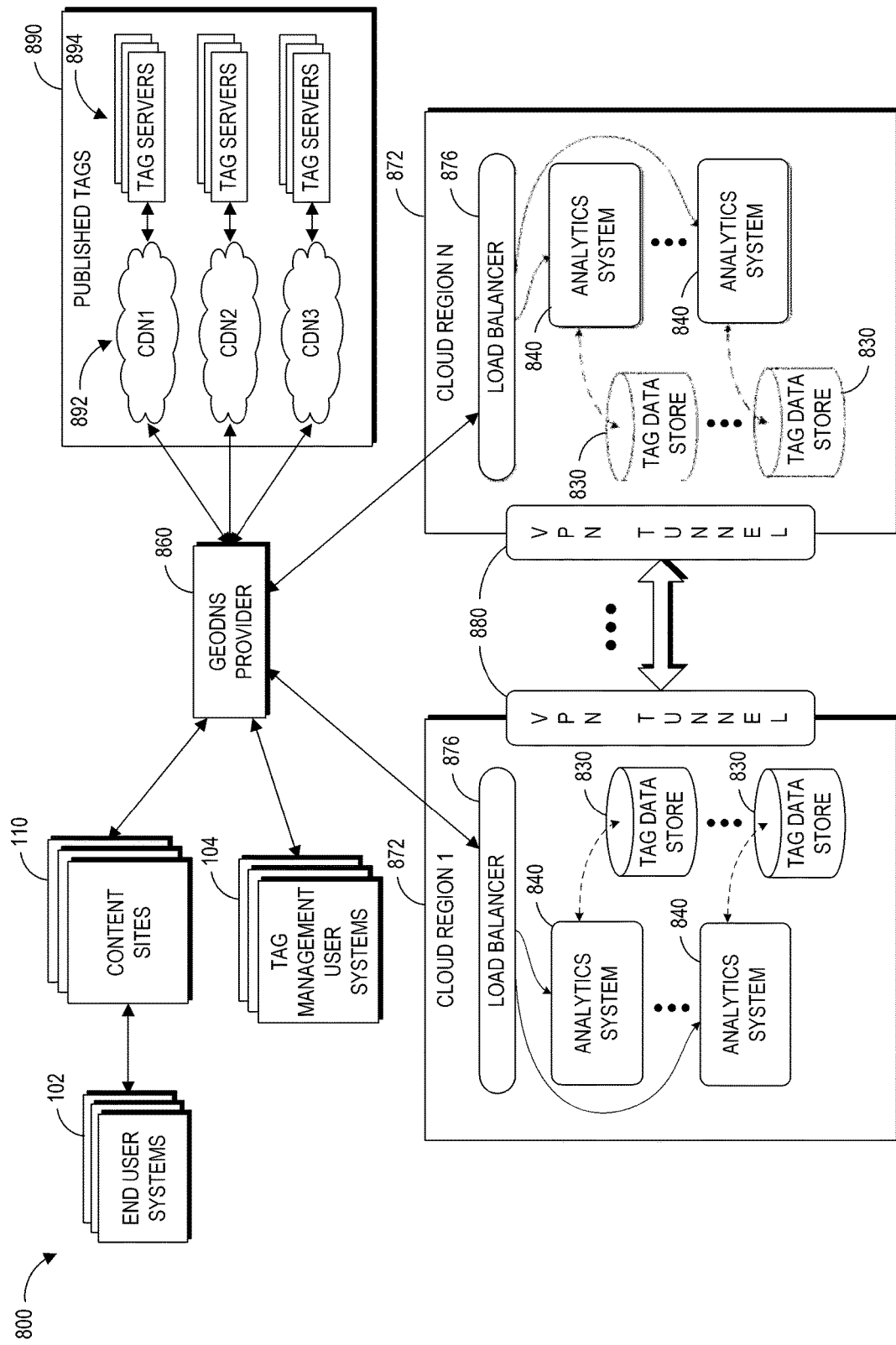
FIG. 8 depicts another embodiment of a computing environment, which provides distributed cloud-based access.

Turning to FIG. 8, a more detailed example embodiment of a computing environment 800 is shown that can perform any of the analytics features described herein. The computing environment 800 is a more detailed example of implementation of the computing environment 100 of FIG. 1. As in FIG. 1, end user systems 102 are shown in communication with content sites 110 which may communicate over a network (not shown). In addition, tag management user systems 104 are also shown. The computing environment 800 facilitates implementation of an analytics system 840, which may include the functionality of the analytics system 130 described above.

In the depicted embodiment, the analytics system 840 is shown distributed in a cloud platform that provides redundant and geographically dispersed access to the analytics system 840. In particular, the analytics system 840 is implemented in various cloud regions 872. These cloud regions may be implemented in any type of cloud platform, which may simply be a data center operated by a vendor of the analytics system or by a third-party vendor such as Amazon Web Services™, Microsoft Azure™, Rackspace™, Linode™, combinations of the same, or the like. Each cloud region 872 includes a load balancer 876 that can balance requests to analytics system instances 840.

The analytics system instances 840 can be implemented as virtual machines and/or physical machines. In the Amazon Web Services embodiment, the instances 840 can be elastic compute cloud (EC2) instances that are distributed geographically for faster and redundant access to geographically dispersed analysis user systems 104. In addition, visitor profile data storage devices 830 are shown in the different cloud regions 872 and can store tag and visitor data in the cloud. Virtual private network (VPN) tunnels 880 facilitate secure communication in a virtual private network among the different cloud regions 872 and enable administrator users (not shown) of the analytics system to access analytics system instances 840.

In an embodiment, the virtual private network is facilitated or provided by a private cloud service, such as the Virtual Private Cloud (VPC) service provided by Amazon Web Services™. The private cloud service can provide security to the analytics system instances 840 by virtue of obscuring IP addresses of the analytics instances 840. The analytics system instances 840 may have nonpublic IP addresses so that each analytics system instance 840 does not need to have security software that is responsible for securing the analytics system 840 itself.

A geodns provider 860 is provided for interfacing between content sites 110, analysis user systems 104, and the various analytics system instances 840. The geodns provider 860 also provides access to published tags 890 which are stored in tag servers 894 accessible through one or more or content delivery networks (CDNs) 892. The function of the geodns provider 860 in one embodiment is to periodically determine which CDN hosting the tags has the lowest latency, thereby selecting which CDN to point the content site 110 to when accessing tags on the tag servers 894. The geodns provider 860 may implement the DYN DNS system in one embodiment.

Advantageously, in certain embodiments, by storing tags in CDNs, tag access can be much faster than if tags were stored in locally hosted tag servers. Further, by using a geodns provider 860, access to tags can be even more rapidly achieved by cycling through the fastest available CDNs 892.

V. Additional Embodiments and Terminology

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

In some embodiments, the universal identifier does not include personally identifiable information (e.g., email address, login username, rewards member number, or the like, that can be associated with the end user system 102) so as to avoid making such information known to multiple vendors. Alternatively, at least some of this additional information may be used (e.g., with user permission) in addition to or instead of tracking a universal identifier of a first-party or third-party cookie. For example, the universal identifier including this additional information can be provided by the end user system 102 to the visitor processing system 140 or the tag vendor systems 170 as a result of executing one of the tags 116, 118. In another example, the universal identifier including this additional information can be provided by the identification subsystem 152 to the end user system 102 and, in turn, provided by the end user system 102 to the visitor processing system 140 or the tag vendor systems 170 as a result of executing of one of the tags 116, 118. Moreover, in certain embodiments, the content page 112 may not include a tag container 114 as illustrated in FIG. 1. Instead, the tags 116, 118 can be directly coded in the content page 112.

In some embodiments, personally identifiable information (e.g., email address, login username, rewards member number, or the like, that can be associated with the end user system 102) can be used to match multiple universal identifiers to a single end user. For example, a visitor to a content page 112 may visit the content page 112 using one or more devices, such as a mobile device, a laptop, and a desktop computer. Each of these devices may be assigned a different universal identifier. Without additional information, each of these devices may be treated as a different visitor to the content page 112. However, using the personally identifiable information, the different universal identifiers for the end user's devices can advantageously be associated with the same end user. In some embodiments, the identification subsystem 152 can associate the personally identifiable information with the universal identifiers and provide matching universal identifiers to the devices so that each of the devices has the same universal identifier. Accordingly, the same universal identifier can be associated both across different content sites and across different end user devices in certain implementations. Alternatively or additionally, the visitor intelligence system 180 may match the processed data associated with different universal identifiers using the personally identifiable information.

In an embodiment, a method of identifying user data associated with a user of a content page can be performed under control of an identification system comprising a physical computing device including digital logic circuitry. The method can include receiving, from a user system, identification data associated with a content site. The identification data can include first data corresponding to a domain of the content site and second data corresponding to a domain of the identification system. The method can further include in response to said receiving the identification data, transmitting to the user system an identifier determined based at least on the second data and usable by the content site to identify the user system. In one example, the first data can include a first-party cookie, and the second data can include a third-party cookie including the identifier. Moreover, the method of this paragraph can be performed by a system including one or more memory devices and one or more hardware processors in communication with the one or more memory devices.

In another embodiment, a method of identifying user data associated with a user of a content page can be performed under control of a content management system comprising a physical computing device including digital logic circuitry. The method can include receiving a request from a user system for a content page stored in a content server. In addition, the method can include transmitting to the user system the content page and a data collection tag container including executable code that when executed by the user system causes the user system to obtain one or more tags. The one or more tags can include executable code that when executed by the user system causes the user system to obtain a visitor identifier, modify the content page to include the visitor identifier, and transmit the visitor identifier obtained from the modified content page and visitor data associated with the user system to one or more analysis systems. Moreover, the method of this paragraph can be performed by a system including one or more memory devices and one or more hardware processors in communication with the one or more memory devices.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A hardware processor can include electrical circuitry or digital logic circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a device controller, or a computational engine within an appliance, to name a few.

The steps of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed:

1. A method for collecting and identifying user data associated with user interactions with a content page, the method comprising:
    under control of a physical computing device comprising a hardware processor and a memory device:
        loading a content page of a content site in the memory device;
        outputting the content page for presentation on a display to a user of the physical computing device;
        adding an identifier to the content page so that the identifier is accessible from the content page by a first tag and a second tag, the identifier being usable to identify the physical computing device separately from other physical computing devices that load the content page;
        executing a script of the first tag to:
            retrieve the identifier from the content page,
            gather first data indicative of first user interactions with the content page, and
            transmit the first data in association with the identifier retrieved from the content page to a first processing system; and
        executing a script of the second tag to:
            retrieve the identifier from the content page, gather second data indicative of second user interactions with the content page, and
            transmit the second data in association with the identifier retrieved from the content page to a second processing system different from the first processing system.

2. The method of claim 1, wherein said adding the identifier to the content page comprises adding the identifier to a data object of the content page.

3. The method of claim 1, wherein said adding the identifier to the content page comprises adding the identifier to a data layer of the content page.

4. The method of claim 1, wherein the identifier does not comprise personally identifiable information.

5. The method of claim 1, further comprising determining, under control of the physical computing device, the identifier without using personally identifiable information.

6. The method of claim 1, further comprising determining, under control of the physical computing device, the identifier by looking up the identifier in a data file stored on the memory device and associated with the content site.

7. The method of claim 1, wherein the first tag and the second tag do not have native access to the identifier.

8. The method of claim 1, further comprising:
under control of the physical computing device:
loading another content page of another content site in the memory device, the another content site belonging to a different domain from the content site;
outputting the another content page for presentation on the display;
adding the identifier to the another content page so that the identifier is accessible from the another content page by a third tag; and
executing a script of the third tag to:
retrieve the identifier from the another content page,
gather third data indicative of third user interactions with the another content page, and
transmit the third data in association with the identifier retrieved from the another content page to a third processing system.

9. The method of claim 1, wherein the first user interactions and the second user interactions are the same.

10. The method of claim 1, wherein the first user interactions and the second user interactions are different.

11. The method of claim 1, wherein the first processing system comprises a first server, and the second processing system comprises a second server different from the first server.

12. The method of claim 1, further comprising receiving, under control of the physical computing device, the first tag and the second tag via a computer network.

13. The method of claim 1, wherein said outputting the content page comprises outputting the content page for presentation in a browser.

14. The method of claim 1, wherein the first data comprises data indicative of selection of an item of the content page by the user.

15. An apparatus for collecting and identifying user data associated with user interactions with a content page, the apparatus comprising:
a physical computing device comprising:
a memory device; and
a hardware processor in communication with the memory device, the hardware processor being configured to:
load a content page of a content site in the memory device;
output the content page for presentation on a display to a user of the physical computing device;
add an identifier to the content page so that the identifier is accessible from the content page by a first tag and a second tag, the identifier being usable to identify the physical computing device separately from other physical computing devices that load the content page;
execute a script of the first tag to:
retrieve the identifier from the content page,
gather first data indicative of first user interactions with the content page, and
transmit the first data in association with the identifier retrieved from the content page to a first processing system; and
execute a script of the second tag to:
retrieve the identifier from the content page,
gather second data indicative of second user interactions with the content page, and
transmit the second data in association with the identifier retrieved from the content page to a second processing system different from the first processing system.

16. The apparatus of claim 15, wherein the hardware processor is configured to add the identifier to a data object of the content page or a data layer of the content page.

17. The apparatus of claim 15, wherein the identifier does not comprise personally identifiable information.

18. The apparatus of claim 15, wherein the first tag and the second tag do not have native access to the identifier.

19. The apparatus of claim 15, wherein the hardware processor is configured to:
load another content page of another content site in the memory device, the another content site belonging to a different domain from the content site;
output the another content page for presentation on the display;
add the identifier to the another content page so that the identifier is accessible from the another content page by a third tag; and
execute a script of the third tag to:
retrieve the identifier from the another content page,
gather third data indicative of third user interactions with the another content page, and
transmit the third data in association with the identifier retrieved from the another content page to a third processing system.

20. The apparatus of claim 15, wherein the hardware processor is configured to receive the first tag and the second tag via a computer network, and the first processing system comprises a first server and the second processing system comprises a second server different from the first server.

* * * * *